(12) United States Patent
Giesbers et al.

(10) Patent No.: US 11,090,860 B2
(45) Date of Patent: Aug. 17, 2021

(54) 3D PRINTING OF GRAPHENE (OXIDE) COMPOSITES

(71) Applicant: PHILIPS LIGHTING HOLDING B.V., Eindhoven (NL)

(72) Inventors: Adrianus Johannes Maria Giesbers, Eindhoven (NL); Johan Hendrik Klootwijk, Eindhoven (NL); Abraham Rudolf Balkenende, Eindhoven (NL); Elise Claude Valentine Talgorn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 633 days.

(21) Appl. No.: 15/554,175

(22) PCT Filed: Feb. 19, 2016

(86) PCT No.: PCT/EP2016/053507
§ 371 (c)(1),
(2) Date: Aug. 28, 2017

(87) PCT Pub. No.: WO2016/142147
PCT Pub. Date: Sep. 15, 2016

(65) Prior Publication Data
US 2018/0079132 A1     Mar. 22, 2018

(30) Foreign Application Priority Data

Mar. 6, 2015  (EP) ................................. 15157997

(51) Int. Cl.
*B29C 64/153*    (2017.01)
*B33Y 70/00*     (2020.01)
(Continued)

(52) U.S. Cl.
CPC .......... *B29C 64/153* (2017.08); *B29C 64/118* (2017.08); *B33Y 10/00* (2014.12);
(Continued)

(58) Field of Classification Search
None
See application file for complete search history.

(56) References Cited

U.S. PATENT DOCUMENTS 5,622,216 A * 4/1997 Brown .................. B22D 11/00
                                                            164/71.1
2013/0303002 A1   11/2013 Oosterhuis et al.
(Continued)

FOREIGN PATENT DOCUMENTS

WO    WO2013040636 A1    3/2013
WO    WO2014168979 A1    10/2014

OTHER PUBLICATIONS

Trusovas, Romualdas et al. "Laser Induced Graphite Oxide/Graphene Transformation", Journal of Laser Micro/Nanoengineering vol. 7, No. 1, (2012), p. 49-53.*
(Continued)

*Primary Examiner* — Matthew J Daniels
*Assistant Examiner* — Mohammad M Ameen

(57) ABSTRACT

The invention provides a method for printing a 3D printed object (100), the 3D printed object (100) comprising a first type of printed material (1120) having electrically conductive properties and a second type of printed material (2120) having electrically insulating properties, wherein the method comprises: (I) providing printable material (110), wherein the printable material (110) has electrically insulating properties and wherein the printable material (110) is convertible by heat to a material (1110,1120) having electrically conductive properties; (II) printing with a 3D printer (500) said printable material (110) to generate printed material (120);
(Continued)

and (III) subjecting to heat part of the printed material (120) after deposition; to provide said 3D printed object (100).

7 Claims, 3 Drawing Sheets

(51) Int. Cl.
*B33Y 10/00* (2015.01)
*B29C 64/118* (2017.01)
*B29K 507/04* (2006.01)

(52) U.S. Cl.
CPC .......... *B33Y 70/00* (2014.12); *B29K 2507/04* (2013.01); *B29K 2995/0005* (2013.01)

(56) References Cited

U.S. PATENT DOCUMENTS

| | | |
|---|---|---|
| 2014/0050903 A1 | 2/2014 | Lettow et al. |
| 2014/0265035 A1* | 9/2014 | Buser .................. B29C 67/0088 264/401 |
| 2014/0321028 A1 | 10/2014 | Lee et al. |
| 2014/0367894 A1 | 12/2014 | Kramer et al. |
| 2015/0197063 A1* | 7/2015 | Shinar ..................... G06F 30/00 700/98 |

OTHER PUBLICATIONS

R. Trusovas, et al., "Laser Induced Graphite Oxide/Graphene Transformation", Journal of Laser Micro/Nanoengineering, vol. 7, No. 1, 2012, pp. 49-53.

D.R. Dreyer, et al., "The Chemistry of 5 Graphene Oxide", Chemical Society Reviews, vol. 39, No. 1, Nov. 3, 2009, pp. 228.

* cited by examiner

3D PRINTING OF GRAPHENE (OXIDE) COMPOSITES

CROSS-REFERENCE TO PRIOR APPLICATIONS

This application is the U.S. National Phase application under 35 U.S.C. § 371 of International Application No. PCT/EP2016/053507, filed on Feb. 19, 2016, which claims the benefit of European Patent Application No. 15157997.6, filed on Mar. 6, 2015. These applications are hereby incorporated by reference herein.

FIELD OF THE INVENTION

The invention relates to a method for the production of a 3D printed object. The invention also relates to such object per se, for instance obtainable with such method. The invention further relates to a 3D printer, which may for instance be used in such method for the production of a 3D printed object.

BACKGROUND OF THE INVENTION

Additive technologies wherein a material is incorporated in an object made via such technology are known in the art. US2013303002, for instance describes a three-dimensional interconnect structure for micro-electronic devices and a method for producing such an interconnect structure. The method comprises a step wherein a backbone structure is manufactured using an additive layer-wise manufacturing process. The backbone structure comprises a three-dimensional cladding skeleton and a support structure. The cladding skeleton comprises layered freeform skeleton parts that will form the electric interconnections between the electric contacts of the interconnect structure after a conductive material is applied on the backbone structure. The support structure supports the layered freeform skeleton parts. Parts of the support structure may be removed to isolate and/or expose the electric interconnections. The cladding skeleton can be embedded by an insulating material for providing a further support. Amongst others, the cladding skeleton parts form a single connected tube that is cladded on an inside surface by flushing a plating fluid through the tube for forming the electric interconnections.

Additive manufacturing (AM) is a growing field of materials processing. It can be used for rapid prototyping, customization, late stage configuration, or making small series in production. In many cases to create new functionalities in 3D printed objects a conducting wire or path ("track") is necessary for power. For example when encapsulating an LED one may require conducting wires in order to drive it and switch it on. Fitting wires in 3D-printed parts requires complex printing geometries and limits the printing freedom. In addition, applying wires during the printing severely hinders the printing process and speed (e.g. the printing has to be paused to inserts wires). Also the threading connections will remain a weak point. Printing pure metal conductive paths in a part is not possible with the current 3D-printing technologies. Further, techniques that allow printing metal (laser or e-beam induced metal particle sintering/melting) do not allow the concomitant printing of another material. Techniques that allow multi-material printing like Fused Deposition Modelling (FDM) or jetting, etc., do not yet allow the printing of electrically conductive metals. To overcome this problem metal based printing composites filaments can be used, which show relatively good conductive properties. These filaments though, will have to be alternated with insulating filaments to create a 3D conducting channel.

US-2014/265035 discloses a method of manufacturing an object by 3D printing a material that exhibits an irreversible or non-reversing change in a property according to an amount of heat transferred to the material during an extrusion process. In the disclosed method, the material is heated to a temperature suitable for extrusion. During the extrusion process, a controller alters a flow rate of the material through an extruder to cause a change in heat transfer to the material so that a thermally controllable property of the material can be controlled within the object.

SUMMARY OF THE INVENTION

Hence, it is an aspect of the invention to provide an alternative method for printing a 3D object, which preferably further at least partly obviates one or more of above-described drawbacks. It is also an aspect of the invention to provide an alternative printed 3D object, especially obtainable with such method, which preferably further at least partly obviates one or more of above-described drawbacks. Yet, it is also an aspect of the invention to provide an alternative 3D printer, for instance for use in such method for printing a 3D object, which (alternative 3D printer) preferably further at least partly obviates one or more of above-described drawbacks.

3D printing of conducting paths in an insulating matrix usually requires at least two filaments (assuming e.g. fused deposition modelling), one filament with an insulating material, and one filament with a dispersed metal above the percolation threshold. This invention proposes to use a material which is an insulator but can be (thermally) activated to become a conductor. Therefore, the same material can be used to print insulating and conducting paths of even insulated wires. This allows printing techniques that can print only with a single starting material to produce parts with insulating and conductive elements. Also this may greatly simplify printing 3D objects having electrical conductive tracks (incorporated in the 3D object). Especially, a solution of incorporating e.g. graphene oxide in a polymer is proposed to solve the above-indicated problems, as graphene oxide is an insulator but if annealed, by e.g. a laser or other means, it can be reduced to graphene, which is a good electrical conductor.

An additional advantage of using graphene is sustainability. In 3D-printed parts where different materials are deposited together, it is very difficult to separate the components at the end of the part lifetime. This poses especially a difficulty when this concerns electronic components and connections, as embedding implies that the entire product becomes electronic waste. Given the low concentration of valuable materials in such embedded equipment, the recovery will be greatly limited, while the environmental burden will increase. Graphene and graphene oxide, or other materials proposed herein, may have substantially no impact on the environment.

Hence, in a first aspect the invention provides a method for printing a 3D printed object ("object"), the 3D printed object comprising a first type of printed material having electrically conductive properties ("first material") and a second type of printed material having electrically insulating properties ("second material"), wherein the method comprises: (I) providing printable material, wherein the printable material has electrically insulating properties and wherein the printable material is convertible by heat to a material having electrically conductive properties; (II) printing with a 3D printer said printable material to generate printed material; and (III) subjecting to heat part of the printed material to provide said 3D printed object. By subjecting to heat part of the printed material after deposition, first type of printed material having electrically conductive properties is generated.

More especially, the invention provides a method for printing a 3D object, the 3D printed object comprising a first type of printed material having electrically conductive properties and a second type of printed material having electrically insulating properties, wherein the method comprises printing the printable material to provide printed material, wherein the printable material is especially provided through a 3D printer outlet of a 3D printer for deposition of said printable material, thereby providing said printed material as deposited printable material, wherein the printable material has electrically insulating properties and wherein the printable material is convertible by heat to material having electrically conductive properties, wherein part of the printed material after deposition is subjected to heat to provide said 3D printed object (comprising said first type of printed material having electrically conductive properties and said second type of printed material having electrically insulating properties).

The above indicated method(s) may thus especially be used to provide a 3D object having electrically conductive material and electrical non-conductive material (i.e. isolating material). Hence, in yet a further aspect, the invention also provides a 3D printed object per se, such as especially obtainable by the additive manufacturing (AM) method as described herein. Especially, the invention also provides in a further aspect a 3D printed object, comprising a first type of printed material having electrically conductive properties and a second type of printed material having electrically insulating properties, wherein the first type of printed material having electrically conductive properties comprises one or more of graphite and graphene, especially graphene, and wherein the second type of printed material having electrically insulating properties comprises one or more of graphite, graphite oxide, graphene and graphene oxide, and wherein especially the first type of printed material has an electrical conductivity of at least 0.01 S/cm (Siemens per centimeter), especially at least 0.1 S/cm, such as at least 1 S/cm, like e.g. in the range of 1-1000 S/cm, and wherein especially the second type of printed material has an electrical conductivity of at maximum $1.10^{-5}$ S/cm, even more especially at maximum $1.10^{-6}$ S/cm. When the second type of material comprises one or more of graphite and graphene, this will be below the percolation limit (as the second type of material is electrically insulating). Hence, the terms "electrically non-conductive" or "electrically isolating" especially indicate a conductivity of at maximum $1.10^{-5}$ S/cm; the term "electrically conductive" especially indicates a conductivity of at least 0.01 S/cm.

With such method, with essentially one composition a 3D printed object may be created, with conventional 3D printing technologies, such as FDM printing, inkjet printing, dispensing printing, or stereo-lithography printing, etc., wherein such 3D printed object locally has electrically conductive material and locally has electrical non-conducting material. Especially the part that has electrical conductive properties may be configured as track ("electrically conductive track"), like a wire (electrically conductive wire). Hence, in general the part of the 3D printed object that is electrically conductive is only a small part of the 3D printed object, with the remainder being electrically non-conductive.

The present invention thus provides a simplified method for creating such objects, as only one composition may have to be used. Further, by using heating, such as e.g. with a laser, conductive tracks may be created with high precision. Yet, as also indicated above, the invention also provides a 3D printed object that may substantially save the environment, or which may at least be environmentally friendlier than hybrid products wherein different types of materials have to be applied.

The terms "3D printed object" or "3D object" refer to a three dimensional object obtained via 3D printing (which is an additive manufacturing process), such as an object having a height, a width and a length. The 3D object can in principle be any object that is 3D printable. It can be an item with a use function or a purely decorative item. It can be a scale model of an item such as a car, a house, a building, etc. Further, the 3D object can be a piece or element for use in another device or apparatus, such as a lens, a mirror, a reflector, a window, a collimator, a waveguide, a color converting element (i.e. comprising a luminescent material), a cooling element, a locking element, an electrically conducting element, a casing, a mechanical support element, a sensing element, etc. The 3D printed object comprises 3D printed material.

Additive Manufacturing (AM) is a group of processes making three-dimensional objects from a 3D model or other electronic data source primarily through additive processes. The additive process can involve the binding of grains (via sintering, melting, or gluing) or of layers of material (via successive deposition or production of the layers, e.g. polymerization), etc. A widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Another term for FDM is "fused filament fabrication" (FFF). Herein, the term "filament 3D printing" (FDP) is applied, which is considered to be equivalent to FDM or FFF. In general, FDM printers use a thermoplastic filament, which is heated to its melting point and then extruded, layer by layer, (or in fact filament after filament) to create a three dimensional object. FDM printers can be used for printing complicated object. Hence, in an embodiment the method includes production of the 3D printed object via an FDM 3D printing. Such filament will thus comprise polymeric material (further) comprising ("hosting") one or more of graphene, graphene oxide, graphite, and graphite oxide, see further also below. The polymeric material is herein also indicated as "polymeric host material".

The 3D printed object is especially (at least partly) made from 3D printable material (i.e. material that may be used for 3D printing).

In general these (polymeric) materials have a glass transition temperature $T_g$ and/or a melting temperature $T_m$. The 3D printable material will be heated by the 3D printer before it leaves the nozzle (assuming e.g. FDM) to a temperature of at least the glass transition temperature, and in general at least the melting temperature. Hence, in an embodiment the 3D printable material comprises a thermoplastic polymer, such as having a glass transition temperature ($T_g$) and/or a melting point ($T_m$), and the printer head action comprises heating the one or more of the receiver item and 3D printable material deposited on the receiver item to a temperature of at least the glass transition temperature, especially to a temperature of at least the melting point. In yet another embodiment, the 3D printable material comprises a (thermoplastic) polymer having a melting point ($T_m$), and the printer head action comprises heating the one or more of the receiver item and 3D printable material deposited on the receiver item to a temperature of at least the melting point. Specific examples of materials that can be used (herein) can e.g. be selected from the group consisting of acrylonitrile butadiene styrene (ABS), polylactic acid (PLA), polycarbonate (PC), polyamide (PA), polystyrene (PS), lignin, rubber, etc.

As indicated above, also techniques other than FDM may be applied, such as inkjet printing, stereo-lithography, spray printing, powder bed printing, etc. As indicated above, whatever printable material is used, it will especially include an electrically conducting species or a precursor thereof. The term "printable material" may also refer to a plurality of different 3D printable materials. The term "printable material" refers to material that can be printed. For instance, in the case of FDM the printable material may comprise a heated polymer that is flowable. The printable material may be solid at room temperature, but upon heating may become printable (i.e. especially flowable). This heating is especially intended to provide a flowable or printable material; an additional heat may be applied to convert (part of) the printable material into the first type of printed material having electrically conductive properties. In the case of stereo-lithography, the printable material may comprise liquid material that is curable (by light, such as laser radiation), etc. In the case of inkjet printing, the printable material may comprise particles (especially graphene (oxide) and/or graphite (oxide) flakes) in a liquid (that may (be) evaporate(d) after deposition). In the case of powder binding the printable material may comprise particles that are hold together by a binding material (glue). In the case of powder sintering or melting the printable material may comprise particles that are sintered or melted together by heat. The term "printed material" especially herein refers to printable material that has been deposited or printed. Hence, the term "printable material" herein especially refers to the material not (yet) deposited or printed.

The above indicated method(s) according to the invention may thus be seen as a modification of a general 3D printing method, such as especially a 3D printing method for printing a 3D object ("object"), the 3D printed object comprising a printed material, wherein the (general 3D printing) method comprises printing the printable material to provide printed material. The printable material may especially be provided through a 3D printer outlet of a 3D printer for deposition of said printable material, thereby providing said printed material as deposited printable material, though, as indicated above, other embodiments may also be possible.

The modification of the general 3D printing method may in an embodiment especially be directed to a(n additional) heating stage, which may in an embodiment be used to heat the printable material before deposition on a receiver item (or on 3D printed material, already printed, on said receiver item) to convert the printable material to electrically conductive printable material. In another embodiment, the heating stage may be used to heat the (just) generated printed material (such as deposited printable material), to provide the second type of printed material. The modification may in an embodiment also relate to the printable material used. For instance, the printable material may comprise electrically conducting material, but in a concentration below the percolation limit, i.e. the printable material is non-conducting. Upon increasing the concentration (see further below), the percolation limit may be reached, thereby providing electrically conducting material. In yet another embodiment, the printable material comprises a precursor of an electrically conducting material, the precursor however being (substantially) electrically non-conducting. Upon conversion (e.g. a heat treatment, see further below), the precursor is converted into an electrically conducting species, thereby providing a (printable) material that may be electrically conducting. Hence, graphene oxide and/or graphite oxide may be used as precursor(s). Note that in embodiments the second type of printed material may include such precursor (which is thus not (thermally) converter).

To start with the modification which relates to the printable material used, the printable material may in an embodiment comprise an electrically conductive material (or species), or in another embodiment comprise a precursor thereof, or in yet another embodiment comprise a combination thereof.

The electrically conductive material may especially comprise one or more of graphene and graphite, especially graphene. The term "electrically conductive material" thus especially relates to the electrically conductive species that may e.g. be comprised by the printable material, such as electrically conductive material hosted by a polymeric material. The term "graphene" is known in the art and especially relates to monolayers of carbon atoms in a hexagonal configuration. The term "graphene" may also be used to multi-layers thereof, such as up to about stacks of ten monolayers. Larger stacks are generally indicated as graphite. Especially, the graphene or graphite are provided as flakes. Flakes generally have dimensions in the range of 0.3-5 nm thick (i.e. up to about 10 mono layers), and in the range of up to 50 nm, such as up to 500 µm, in length/width/diameter, like in the range of 0.05-500 µm.

Even when the printable material comprises (such) electrically conductive material, the printable material (comprising said electrically conductive material), at least before printing, may substantially be electrically non-conducting. Hence, as stated above, the printable material has electrically insulating properties. Would this material be provided per se on a receiver item, or on printed material on such receiver item, the (newly) printed material will also have substantially insulating properties. Hence, when printable material is applied that comprises electrically conductive material, the electrically conductive material is available below the percolation limit, i.e. a concentration below which the material is an electrical isolator (and above which the material may have electrically conducting properties).

The printable material may especially comprise a host material, wherein the electrically conductive material, or its precursor, is embedded, such as dispersed.

For instance, printable material ("composite") may in an embodiment comprise a polymeric material comprising said electrically conductive material (embedded in the polymeric material). In general, the volume percentage of the electrically conductive material (in the polymeric (host) material) may be below about 20 vol. %, such as below about 10 vol. %, such as even below about 2 vol. %. The concentration may depend upon the type of electrically conductive material, such as flake shaped or more spherically shaped. By removing part of the host material, such by heating, the concentration is increased and the percolation limit may be passed. Thereby, an electrically conductive material is obtained. As will be further elucidated below, part of the printed material is subjected to heat. The remaining part of the printed material that is not subjected to heat will keep its insulating properties. Hence, such material may comprise polymeric material comprising one or more of graphite and graphene. The polymeric (host) material is thus especially electrically non-conductive. Therefore, the printable material may in an embodiment comprise an electrically conductive material, such as graphene and/or graphite, but is (overall) not electrically conductive, i.e. the electrically conductive material in the printable material is especially at a concentration below the percolation limit.

The electrically insulating material may especially comprise one or more of graphene oxide and graphite oxide, especially graphene oxide. The term "electrically insulating material" thus especially relates to the electrically non-conductive species that may e.g. be comprised by the printable material, such as electrically insulating material hosted by a polymeric material. The terms "graphene oxide" and "graphite oxide" are known in the art and especially relates oxygen modification of graphene and graphite respectively. Herein, graphene oxide and/or graphite oxide are thus (potential) precursors of electrically conductive material. Especially, the graphene oxide or graphite oxide are provided as flakes. Flakes generally have dimensions in the range of 0.3-5 nm thick (i.e. up to about 10 mono layers), and in the range of 0.05-500 µm in length/width/diameter.

Hence, the electrically conductive material, or its precursor, especially comprise particles, such as flakes.

Hence, when the printable material comprises electrically insulating material, such as graphene oxide, such material when provided per se on a receiver item, or on printed material on such receiver item, will have substantially electrically insulating properties. Hence, during printing, i.e. the printable material, or after printing, i.e. the printed material, has to undergo a modification to become electrically conductive (when the relevant part should be electrically conductive).

For the transition from insulating to conducting, heat is applied, as graphene oxide and/or graphite oxide may be reduced by heat, see for instance also D. R. Dreyer et al., Chem. Soc. Rev. 2010, 39, 228-240, and Trusovas et al., Carbon 52 (2013), p. 574-582, which are herein incorporated by reference. For instance, it is indicated that irradiating graphite oxide with a single laser pulse at a fluence of 0.04 J/cm2 (50 mW) may locally increase the temperature to 1400° C. for a few nanoseconds, which can be sufficient for the effective reduction of graphite oxide to graphene with a plurality of pulses.

For example, the heating may utilize a laser output power of at least 0.036 W and a beam speed of 0.01 m/s or less, e.g. 0.005 m/s or less. Alternatively, the heating may utilize a laser output power of at least 0.05 W and a beam speed of 0.02 m/s or less, e.g. 0.01 m/s or less. It is envisaged that also a laser output power of less than 0.036 may achieve ablation when combined with very low beam speed, e.g. about 0.001 m/s (1 mm/s) or less.

In some embodiments, the printed material is exposed to heating of an exposure time of up to 15 ms. In other embodiments, the layer is exposed to heating of an exposure time of less than 12 ms, such as less than 10 ms, or such as less than 8 ms. In other embodiments, the layer is exposed to heating of an exposure time of less than 6 ms, such as less than 4 ms, or such as less than 2 ms. The exposure time is suitably selected with regard to the laser output power, and/or the absorbed laser power density, in order to achieve ablation. More specifically, the shorter the exposure time, the higher laser output power is generally required in order to achieve ablation of the layer comprising graphene oxide. In some embodiments, the heating is adapted to provide an absorbed laser power density of at least 400 W/mm$^2$. For example, the heating may be adapted to provide an absorbed laser power density of at least 500 W/mm$^2$, such as at least 600 W/mm$^2$, or at least 700 W/mm$^2$. In some embodiments, the heating in step (b) is adapted to provide an absorbed laser power density of at least 800 W/mm$^2$. In some embodiments, the heating is adapted to provide an energy density of less than 6.4 J/mm$^2$. In other embodiments, the heating in step (b) provides an energy density of less than 5 J/mm$^2$, such as less than 4 J/mm$^2$, or such as less than 3 J/mm$^2$. However, especially the heating may be adapted to provide an energy density of at least than 0.1 J/mm$^2$, such as at least 0.5 J/mm$^2$.

Likewise, heating with a heating unit may be applied to convert the graphite oxide and/or graphene oxide into graphite and/or graphene, especially graphene.

Especially, the heating to convert one or more of graphene oxide and graphite oxide into graphene or graphite, respectively, especially graphene, may temporarily (and locally) require a temperature of at least 1000° C.

In a specific embodiment, however, especially a heating unit may be applied to increase the concentration of (already) available graphite and/or graphene (above the percolation limit). This may require lower temperatures than the conversion of the precursor(s).

Above, embodiments have been described wherein the printable material comprises polymeric material, the polymeric material further comprising (hosting) electrically conductive material. However, the printable material may also comprise a polymeric material hosting a precursor of electrically conductive material (i.e. with the precursor especially being one or more of graphite oxide and graphene oxide), with the precursor thus especially being electrically insulating. The printable material may in an embodiment (thus) especially comprise a host material, wherein the electrically insulating material is embedded, such as dispersed. For instance, printable material ("composite") may comprise a polymeric material comprising said electrically insulating material (embedded in the polymeric material). In general, the volume percentage of the electrically insulating material (in the polymeric (host) material) may be below about 20 vol. %, such as below about 10 vol. %, such as even below about 2 vol. %. However, the concentration in the printable material may also be higher, as the printable material is not electrically conductive (i.e. the graphite oxide and/or graphene oxide is not electrically conductive; and neither will especially the polymeric (host) material be). Due to the (additional) heat, the printable or printed material transforms into electrically conductive material, due to the reduction and optionally assisted by a concentration increase (above the percolation limit, when reduction only would lead to e.g. the above described material comprising electrically conductive material but below the percolation limit). As will be further elucidated below, part of the printed material is subjected to heat. The remaining part of the printed material that is not subjected to heat will keep its insulating properties. Hence, such material may comprise polymeric material comprising one or more of graphite oxide and graphene oxide (and optionally graphene and/or graphite, but below the percolation limit).

The host material especially comprises material that has a relatively low decomposition temperature or a relatively low boiling temperature or a relatively low sublimation temperature, especially at least lower than the decomposition temperature or sublimation temperature of graphene or graphite, respectively. As graphene is quite stable, thermal removal of the host material will in general occur at a higher rate than of graphene. The removal of the host material, at dedicated spots, may be used to increase the volume percentage of the electrically conductive species graphene and/or graphite, thereby passing the percolation limit and allowing generation of printed (or printable) material with electrically conductive properties. Here, the term "temperature" may also refer to a temperature range (as also multi-component compositions may be applied, including polymers having different chain lengths, etc.). The printable material may thus comprise (amongst others) one or more of graphene oxide, graphite oxide, graphene and graphite, especially hosted by a polymeric material. Graphene oxide, graphite oxide, graphene and graphite are also indicated as "filler material". Hence, especially the filler material has a stability that is higher than the stability of the (polymeric) host material.

Examples of polymeric materials that may be used as host material may be solvents e.g. ethanol, N,N-dimethylformamide, tetrahydrofuran, ethylene glycol, mechanical binders that are burned out at a later stage e.g. poly(vinyl alcohol), acrylic copolymers, etc.

As indicated above, heating may be executed with a heating unit, such as with a laser, such as by irradiation part of the printed material. Thereby, a 3D object having electrically conductive material and electrical non-conducting material is provided. As indicated above, in an embodiment especially the first type of printed material has an electrical conductivity of at least 0.01 S/cm, like at least 0.1 S/cm, such as at least 1 S/cm, and especially the second type of printed material has an electrical conductivity of at maximum $1.10^{-5}$ S/cm. Such method may especially comprise printing electrical conductive tracks surrounded by said second type of printed material having electrically insulating properties. Hence, the 3D printed object may especially comprise electrical conductive tracks surrounded by said second type of printed material having electrically insulating properties. These tracks may completely be hidden in the 3D printed object, optionally except for instance for allowing electrical connection with an external power source (although even the power source may optionally be completely integrated in the 3D printed object). The heating to provide (in the end) electrically conductive printed material is thus in general not a mere heating to assist e.g. flowability of the printable material; the heating to provide (in the end) electrically conductive printed material is especially a heating (1) to convert graphite oxide and/or graphene oxide into graphite and/or graphene, respectively, and/or (2) to remove at least part of the (polymeric) host material. Optionally, this removal may also include carbonification (of the polymeric host material).

Hence, the invention includes embodiments including a reduction of filler (such as graphene oxide) that leads to electrical conductivity. The filler concentration may in these embodiments especially be above the percolation limit (of the reduced precursor). The advantage is that can print without locally changing the deposited thickness as the host volume basically remain constant. The inventions also includes embodiments including diminishing/shrinking the host material that leads to electrical conductivity. Here one may especially need to start with electrically conductive species below the "percolation limit". Due the treatment the percolation limit will then be exceeded. These embodiments can be combined. For instance, one may start with graphene oxide below (or above) the "percolation limit". Due to treatment, graphene is locally reduced and simultaneously the percolation may be exceeded. Hence, heat and/or radiation (i.e. heat) the insulating graphene oxide and/or graphite oxide may be converted to electrically conductive species. Dependent upon the concentration, this may be below or above the percolation limited. When being above the percolation limit, the printed material will be electrically conductive. Heat and/or radiation may (thus) also assist in increasing the concentration above the percolation limit by reducing the relative amount of host material (especially polymeric material), and thereby thus increasing the concentration.

In a further embodiment, the 3D printer may further comprise a laser unit configured to irradiate part of the printed material with laser radiation to provide said first type of printed material having electrically conductive properties. The laser is especially configured to provide laser radiation, such as one or more of UV (ultra violet) radiation, VIS (visible) radiation, and IR (infrared) radiation. Especially when a laser unit is applied, in an embodiment the printable material comprises a host material comprising a polymeric material and one or more of graphite and graphene (embedded in the polymeric (host) material), wherein the printable material has electrically insulating properties (especially because of a concentration of the electrically conductive species below the percolation limit), and wherein the method comprises printing said printable material and removing at least part of the host material of the printed material by irradiating said printed material, to provide said first type of printed material having electrically conductive properties. By removing part of the host material, the concentration of the electrically conductive material is especially increased above the percolation limit, and the material becomes thus electrically conductive. In such embodiment, the printable material may especially comprise one or more of graphite flakes and graphene flakes, even more especially the printable material (at least) comprises graphene flakes.

In yet another embodiment, the printable material comprises a host material comprising a polymeric material and one or more of graphite oxide and graphene oxide (embedded in the polymeric (host) material), wherein the method comprises printing said printable material and reducing at least part of the one or more of the graphite oxide and the graphene oxide by irradiating said printed material to provide said first type of printed material having electrically conductive properties. Here, the irradiation is at least used to reduce the oxidic material. Further, the laser radiation may be used to increase the concentration (if necessary). In such embodiment, the printable material comprises a polymer comprising one or more of graphite oxide flakes and graphene oxide flakes.

Therefore, the 3D printer may comprise a conversion unit, such as a heating unit and/or a laser unit. Further, the method as described herein may include the use of such conversion unit. Especially, the conversion unit is configured to provide (in the end) electrically conductive printed material by (1) converting by heat graphite oxide and/or graphene oxide into graphite and/or graphene, respectively, and/or by (2) removing by heat at least part of the (polymeric) host material (thereby especially providing a concentration of the electrically conductive species above the percolation limit). The heat may be provided by e.g. a hot gas and/or a laser, etc.

In general, the volume percentage of the electrically conductive material in the first type of printed material may above about 2 vol. %, such as above about 10 vol. %, such as even above about 20 vol. %. The concentration may depend upon the type of electrically conductive material, such as flake shaped or more spherically shaped. Especially, the concentration in the printable material may be chosen such that the printed material, when configured as first type of printed material, and when subjected to the present method, has a concentration of electrically conductive material (such as graphene and/or graphite) that is above the percolation limit.

In general, the volume percentage of the electrically conductive material (if any) in the second type of printed material may be below about 20 vol. %, such as below about 10 vol. %, such as even below about 2 vol. %. The concentration may depend upon the type of electrically conductive material, such as flake shaped or more spherically shaped. Especially, the concentration in the printable material may be chosen such that the printed material, when configured as second type of printed material, has a concentration of electrically conductive material (such as graphene and/or graphite) that is below the percolation limit.

Hence, in embodiments the printed material is electrically insulating (i.e. the printed material being not electrically conductive), but by irradiation with laser radiation (and/or heating with the heating unit), the printed material is converted to the second type of material. Would the laser unit (and/or the heating unit) be configured to heat the printable material, in embodiments the printable material is electrically insulating (i.e. the printable material being not electrically conductive), but by irradiation with laser radiation (and/or heating with the heating unit), the printable material may be converted to the second type of material.

Hence, the invention provides in a further aspect a 3D printed object obtainable by the method according to any one of the preceding claims. When the 3D printed object is obtained, the object may be further subjected to e.g. a post treatment and/or other actions. For instance, the 3D printed object may be polished, coated, etc. Further, in an embodiment the method of the invention may further comprise functionally connecting an electrical component and the printed material having electrically conductive properties. Note that optionally such functional connection may also be generated during the 3D printing process, as also optionally during this 3D printing process an electrical component may be integrated in the 3D printed object (under construction). The term "electrical component" may e.g. refer to an integrated circuit, PCB, a battery, a driver, but also a light source (as a light source may be considered an optical component and an electrical component), etc.

In yet a further aspect, the invention also provides a 3D printer especially configured to execute the herein described method. Hence, in an aspect the invention provides a 3D printer configured to print a 3D printed object, the 3D printed object comprising a first type of printed material having electrically conductive properties and a second type of printed material having electrically insulating properties, the 3D printer especially comprising a storage for a printable material, and a printer head comprising a 3D printer outlet for printing said 3D printable material to a receiver item, wherein the printable material has electrically insulating properties and wherein the printable material is convertible by heat to a material having electrically conductive properties, wherein the 3D printer further comprises a conversion unit configured to convert said printable material having electrically insulating properties into material having electrically conductive properties by subjecting the printed material after deposition to heat, to provide said 3D printed object by generating the first type of printed material. Hence, the conversion unit may include one or more of a laser unit (see also above) or a heater (see also above). The term "conversion unit" may also refer to a plurality of conversion units. In a specific embodiment, the printer is a fused deposition modelling printer. Further, especially the conversion unit comprises one or more of (i) a heating unit configured to subject the printable material downstream from the 3D printer outlet but before deposition to heat, wherein the heating unit is in specific embodiments functionally coupled to the printer head or the receiver item, and (ii) a radiation unit configured to provide one or more of UV radiation, VIS radiation, and IR radiation to the printed material. By functionally coupling the conversion unit to the printer head or the receiver item, the conversion unit may follow the movement(s) of the printer head or receiver item respectively. Especially, the 3D printer may include a movable (for executing the 3D printing method) printer head, and the conversion unit may in embodiments be associated with such movable printer head.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

Figure 1A:
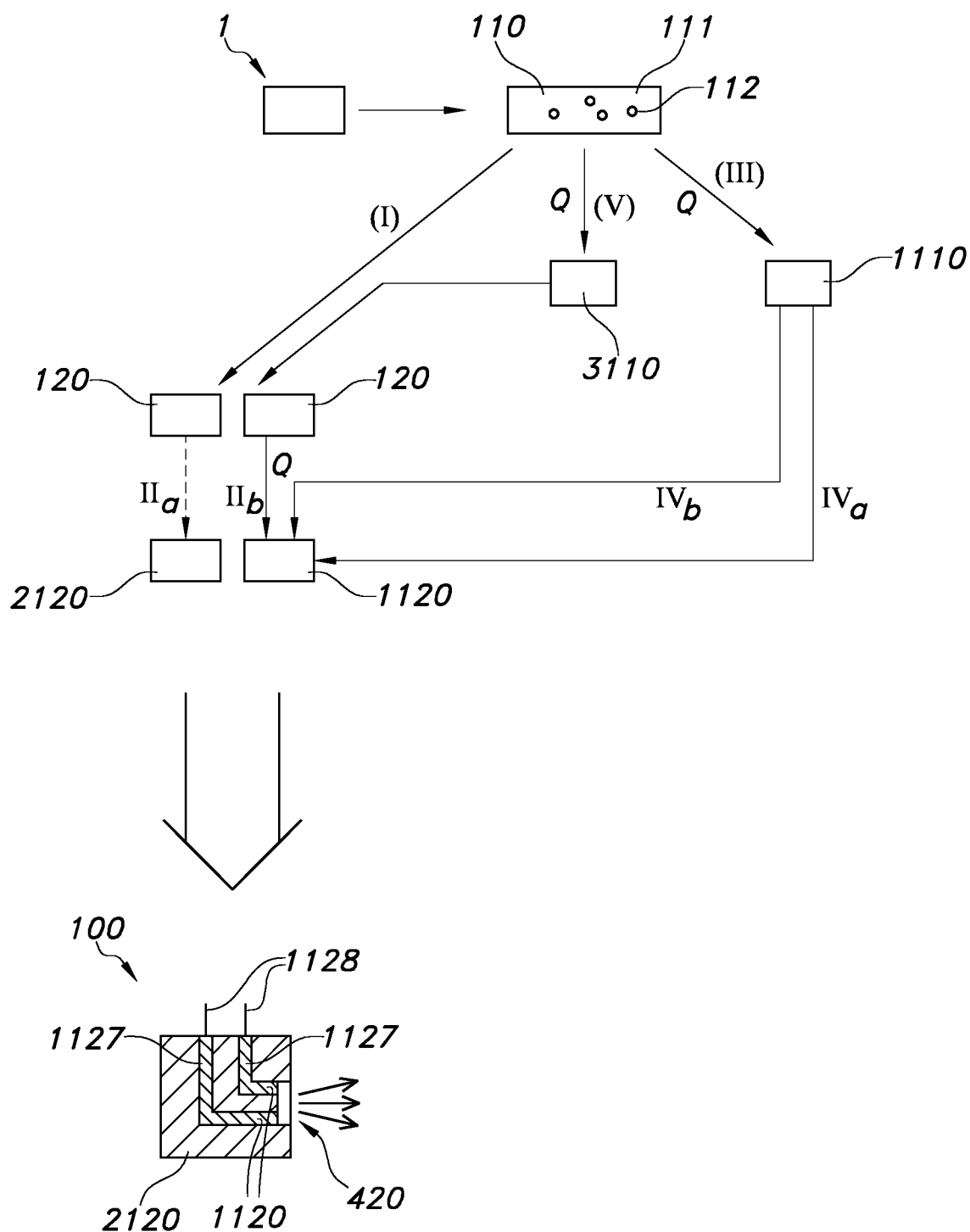
FIGS. 1a-1c schematically depict some aspects of the invention.

FIG. 1a schematically depicts possible process stages of a method for printing a 3D printed object 100. As indicated above, the 3D printed object 100 comprises a first type of printed material 1120 having electrically conductive properties and a second type of printed material 2120 having electrically insulating properties. To obtain such object 100, a method may be used comprising providing printable material 110, wherein the printable material 110 has electrically insulating properties and wherein the printable material 110 is convertible by heat to a material 1110,1120 having electrically conductive properties.

Hence, the method includes providing printable material 110. Subsequently, with a 3D printer 500 said printable material 110 may be printed, to generate printed material 120. During the act of generating the printed material 120 or after having generated the printed material 120, the printable material 110 or printed material 120 may be subjected to heat. Hence, part of the printable material 110 may be heated before generation of the printed material 120. Alternatively or additionally, part of the printed material 120 may be heated after deposition. In this way, said 3D printed object 100 may be provided. Reference 1120 thus refers to a first type of printed material having electrically conductive properties, reference 1110 refers to a printable material having electrically conductive properties. Here, it is indicated that part of the material may be heated. As the 3D object should especially include conductive and isolating parts, in general only part of the printable material and/or part of the printed material will be heated. The phrase "before generation of the printed material 120" especially indicates that the printable material is provided, but not yet deposited or printed, i.e. it is a printable material. When generated (deposited), the material is indicated as printed material (or deposited printed material).

Referring to FIG. 1a, reference 1 may indicate starting materials to produce the printable material 110. For instance, the starting materials may comprise polymer for polymer host material 111 and graphene or graphene oxide flakes 112 (hosted by the polymer (host) material 111). This material is made into printable material ("composite"). To make the printable material really printable, it may be necessary to heat the printable material or to cure the printable material; this is the action of printing, which leads to printed material 120, which may be deposited material or deposited printable material. This stage is indicated with I.

Having provided the printed material 120, part of it may be further processed into electrically conductive (printed) material 1120; this is indicated with IIb. Another part may remain the same, which is indicated with the dashed line with reference IIa. The conversion of the printed material 120 into printed material 1120 having electrically conductive properties is obtained by heating the printed material, which is indicated with the symbol Q.

Alternatively or additionally, part of the printable material 110 may be subjected to a heating before it is provided as printed material (i.e. especially before deposition). This route is indicated with III; the reference Q again indicates the action of conversion. The thus obtained product, printable material having electrically conductive properties, and indicated with reference 1110, may be deposited leading to printed material 120, here printed material 1120 having electrically conductive properties, which process is indicated with reference IVa. Alternatively or additionally, part of this material after printing, i.e. printed material has been obtained, may further be subjected to heat; this is indicated with IVb. Such further heating may lead to a higher conduction, as the concentration of the electrically conductive species may be increased.

Note that alternatively or additionally, the printable material may be subjected to an intermediate heating, indicated with V, leading to a printable material that is not electrically conductive (but that has been subject to some heat after providing said printable material, such as downstream from a nozzle of a 3D (FDM) printer or inkjet printer, etc.). This material, indicated with reference 3110, may subsequently follow the same route as indicated with I, though in general most of the material as printed material 120 will then subsequently be converted to printed material 1120 having electrically conductive properties (IIb). This option may be chosen when a total conversion of the printable material 110 on the flow may lead to undesired properties, e.g. in terms of flowability.

Executing one or more of the actions as indicated above in a plurality of stages may finally lead to a printed 3D object 100. By way of example, this object 100 has further a light source integrated, as an example of an electrical component 420, which is functionally connected with the printed material 1120 having electrically conductive properties, here electrically conductive tracks 1127 (i.e. printed tracks). Further connectors 1128 are functionally connected to these tracks 1127, for instance for a functional connection with a power source (not depicted).

Figure 1B:
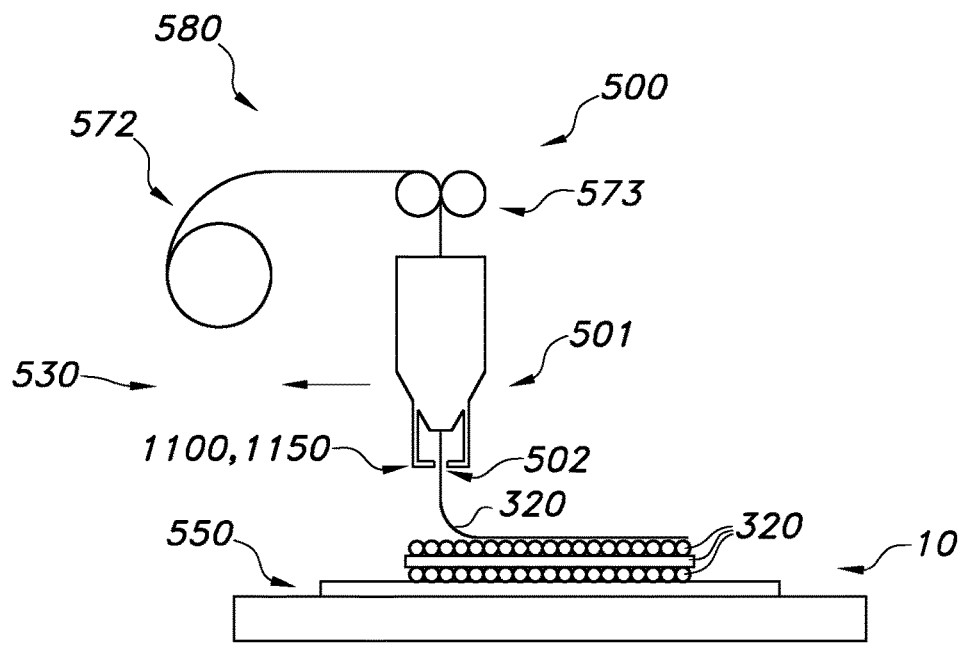

FIG. 1b schematically depicts an embodiment of a 3D printer that may for example be used for the AM method as described herein. This FIG. 1b shows a 3D printer 500 comprising a printer head 501 comprising a first nozzle 502 for printing a 3D printable material 110 to a receiver item 550. By way of example, an embodiment of an FDM printer is schematically depicted. However, other printers may also be possible, such as a stereo-lithography printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may include a plurality of printer heads, though other embodiments are also possible. Reference 502 indicates a printer nozzle. Reference 320 indicates a filament of printable 3D printable material (such as indicated above). For the sake of clarity, not all features of the 3D printer have been depicted, only those that are of especial relevance for the present invention. The 3D printer 500 is configured to generate a 3D item 10 by depositing on a receiver item 550 a plurality of filaments 320 wherein each filament 20 comprises 3D printable material, such as having a melting point $T_m$. The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). Reference 572 indicates a spool with material, especially in the form of a wire. The 3D printer 500 transforms this in a filament or fiber 320. Arranging filament by filament and filament on filament, a 3D item 10 may be formed. The 3D printing technique used herein is however not limited to FDM (see also above). Reference 580 indicates a storage of the printable material (or a precursor thereof). For instance, the spool with material may be used as storage.

The 3D printer 500 further comprises a conversion unit 1100, here by way of example a heater unit 1150. The heater unit 1150 may be functionally coupled to the printer head 501. The heater unit 1150 is especially configured to provide heat to the printable material 110 on the flow (to the receiver item 550). Optionally, the heater unit may be comprise a laser.

Figure 1C:
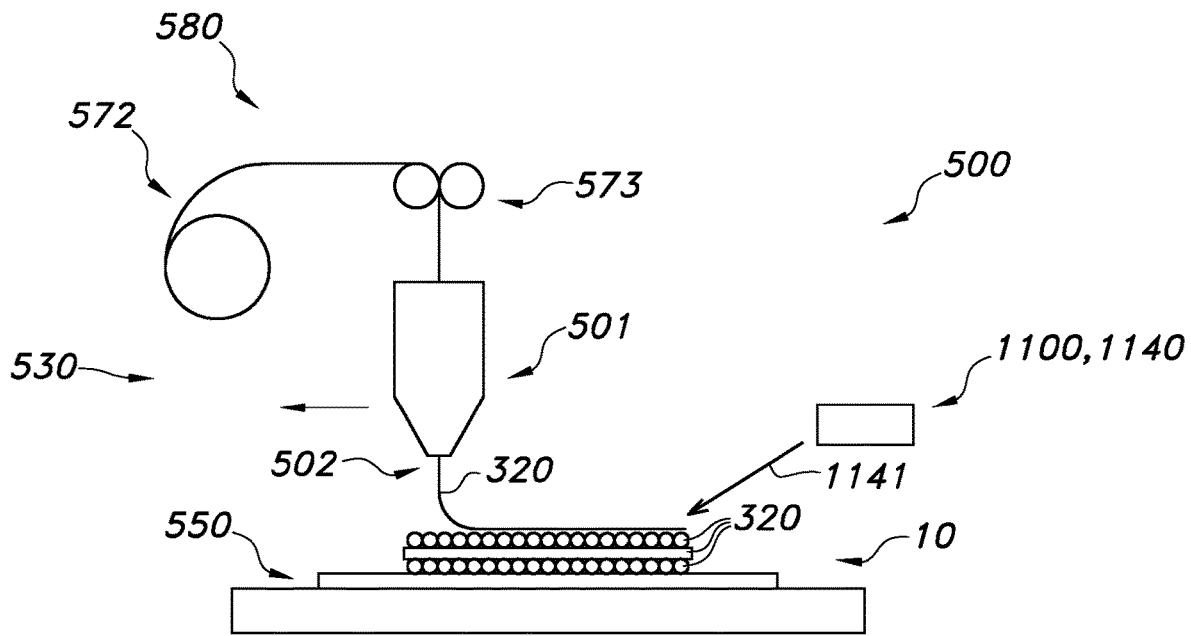

The 3D printer 500 in FIG. 1c further comprises a conversion unit 1100, here by way of example a laser unit 1140. The laser unit 1140 is especially configured to provide heat to the printed material 120 on the receiver item 550. Radiation of the laser unit is indicated with reference 1141. Alternatively or additionally, the laser unit 1140 may be configured to irradiate printable material before deposition, i.e. on the flow.

In a specific embodiment, for instance, a composite material which incorporates graphene oxide flakes above the percolation threshold may be used. The composite as applied is an insulator (as graphene oxide is substantially electrically non-conductive). However by illuminating it with a laser the graphene oxide can be locally reduced to graphene, which is a good conductor. As we are above the percolation threshold the illuminated printed part will now become a conductor.

Figure 2:
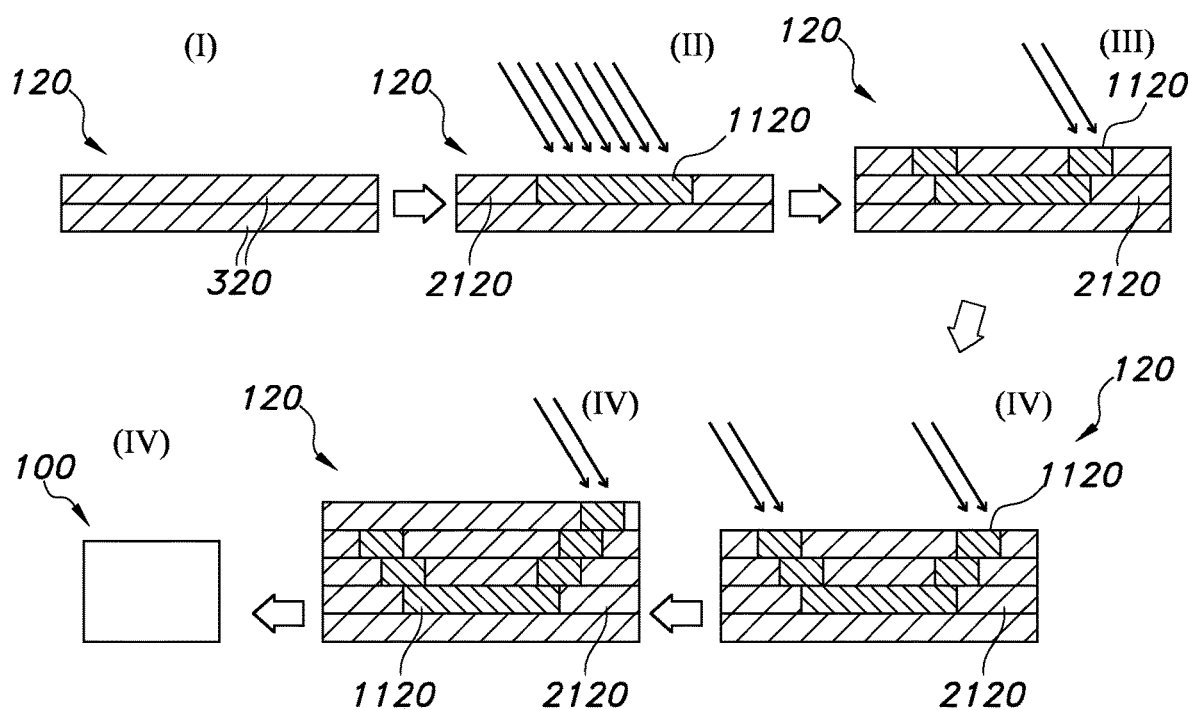
FIG. 2 schematically depicts that the 3D shape can be built-up by layer by layer printing of the composite e.g. by FDM printing. The 3D conducting path can be created by locally reducing the graphene oxide by laser irradiation or by a strong heat treatment during deposition of the GO (graphene oxide or graphite oxide) composite.

FIG. 2 shows a schematic representation of how one may create a 3D conducting path by printing layer by layer (e.g. with a FDM printer) in combination with heating via laser irradiation.

Figure 3:
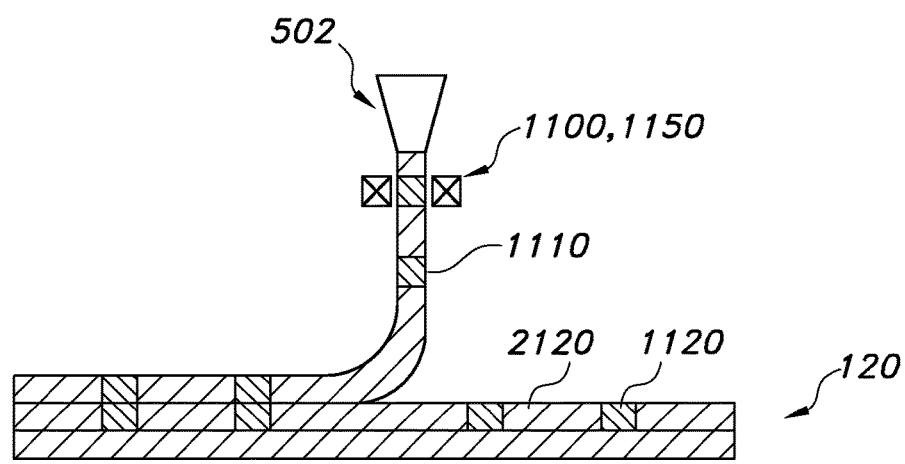
FIG. 3 schematically depicts an embodiment where a heater is used to reduce the graphene oxide into graphene.

A similar result can be achieved by heating the filament 320 once it leaves the nozzle, see FIG. 3. The heat will also reduce the graphene oxide. Heating at predesigned times will lead to conducting areas alternated by insulating areas in order to create a 3D conducting path.

As an alternative to use graphene oxide above the percolation limit also a composite matrix material can be chosen that partly or completely decomposes when heated or that otherwise changes in volume upon a heat treatment. In this way it will be accomplished that the graphene volume fraction increases to above the percolation limit simultaneously with the conversion of graphene oxide to graphene.

As a further embodiment a composite with graphene below the percolation limit can be considered. Upon heating (part of) the composite material shrinks or decomposes, thus locally raising the graphene content above the percolation limit.

The first type of printed material 1120 having electrically conductive properties may thus especially comprise graphite and/or graphene, even more especially graphene. The first type of printed material 1120 having electrically conductive properties may further comprise polymeric host material, with the graphite and/or graphene embedded therein. The first type of printed material 1120 having electrically conductive properties may in an embodiment essentially consist of graphite and/or graphene. In embodiments, the first type of printed material 1120 having electrically conductive properties may further comprise graphite oxide and/or graphene oxide.

The second type of printed material 2120 having electrically insulating properties may in an embodiment thus especially comprise graphite oxide and/or graphene oxide, even more especially graphene oxide. Further, the second type of printed material 2120 having electrically insulating properties may further comprise polymeric host material, with the graphite oxide and/or graphene oxide embedded therein. In a specific embodiment, the second type of printed material 2120 having electrically insulating properties may essentially consist of graphite oxide and/or graphene oxide.

Alternatively or additionally, the second type of printed material 2120 having electrically insulating properties may in an embodiment thus especially comprise polymeric host material, with graphite and/or graphene embedded therein, but below the percolation limit.

Hence, in embodiments the first type of printed material 1120 and the second type of printed material 2120 may substantially be identical, both comprising polymeric material with graphene and/or graphite embedded therein, but with the former having these electrically conductive species above the percolation limit and with the latter having these electrically conductive species below the percolation limit. In further embodiments both the first type of printed material 1120 and the second type of printed material 2120 may comprise the same polymeric (host) material.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A method for printing a 3D printed object of a first type of printed material and a second type of printed material, the method comprising:
    printing with a printer head of a 3D printer the second type of printed material having electrically insulating properties; and
    heating a part of the second type of printed material using a heating unit coupled to the printer head and configured to provide heat to the second type of printed material on a flow to convert the part of the second type of printed material to the first type of printed material having electrically conductive properties, the first type of printed material forming a conducting path through the second type of printed material, and wherein the 3D printed object includes at least one part comprising the first type of printed material and at least one part comprising the second type of printed material.

2. The method according to claim 1, wherein the first type of printed material has an electrical conductivity of at least 0.01 S/cm, and wherein the second type of printed material has an electrical conductivity of at maximum $1.10^{-5}$ S/cm.

3. The method according to claim 1 wherein the heating unit comprises a laser unit configured to irradiate with laser radiation the part of the second type of printed material.

4. The method according to claim 3, further comprising providing a printable material for forming the first type of printed material and the second type of printed material, the printable material comprising a host material, polymeric material, and one or more of graphite and graphene, wherein the printable material has electrically insulating properties, and wherein the method further comprises removing, at least part of the host material of the second type of printed material on the flow by irradiating, using the laser unit, the second type of printed material, to provide the first type of printed material having electrically conductive properties.

5. The method according to claim 4, wherein the printable material comprises one or more of graphite flakes and graphene flakes.

6. The method according claim 3, further comprising providing a printable material for forming the first type of printed material and the second type of printed material, wherein the printable material comprises a host material, a polymeric material, and one or more of graphite oxide and graphene oxide, wherein the method further comprises reducing, after printing the printable material, at least part of the one or more of the graphite oxide and the graphene oxide by irradiating, using the laser unit, the printed material to provide the first type of printed material having electrically conductive properties.

7. The method according to claim 6, wherein the printable material comprises a polymer comprising one or more of graphite oxide flakes and graphene oxide flakes.

* * * * *